United States Patent [19]
McBride, Jr.

[11] 3,978,320
[45] Aug. 31, 1976

[54] DATA CONTROL DEVICES

[76] Inventor: W. Neil McBride, Jr., P.O. Box 371, Conneautville, Pa. 16406

[22] Filed: Feb. 20, 1975

[21] Appl. No.: 550,012

[52] U.S. Cl. .............. 235/61.12 M; 235/61.12 N; 340/173 LS; 360/2
[51] Int. Cl.² ............... G06K 19/04; G06K 19/06; G11B 25/04
[58] Field of Search .......... 235/61.12 N, 61.12 M, 235/61.7 B; 340/149 A, 173 LT, 173 SS; 350/160 R; 360/2

[56] References Cited
UNITED STATES PATENTS

| | | |
|---|---|---|
| 3,702,464 | 11/1972 | Castrucci ................... 235/61.12 N |
| 3,760,162 | 9/1973 | Holter ........................ 235/61.12 N |
| 3,840,288 | 10/1974 | Schnatterly ................... 350/160 R |
| 3,862,716 | 1/1975 | Black et al. ................... 235/61.7 B |

*Primary Examiner*—Daryl W. Cook

[57] ABSTRACT

A portable plastic card is assigned to carry relevant inventory and other data for each of a given number of items. The card both stores and displays sufficient data to make it useful as an inventory control tool. The visual data is a persistent electrochromic display that shows select portions of the data stored in the magnetic track. Two edges of the card are tapered to prevent their improper introduction to a card reader. A diagrammatic drawing shows the preferred use of the card in a slip-issuing mode.

9 Claims, 4 Drawing Figures

U.S. Patent    Aug. 31, 1976    3,978,320
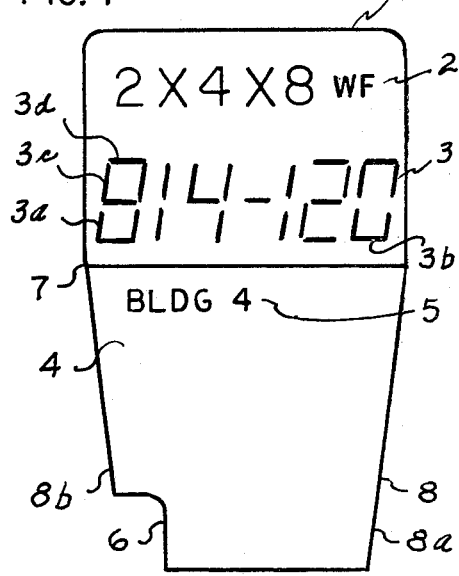
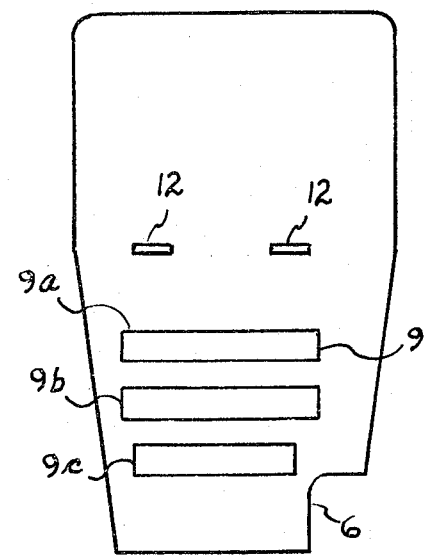
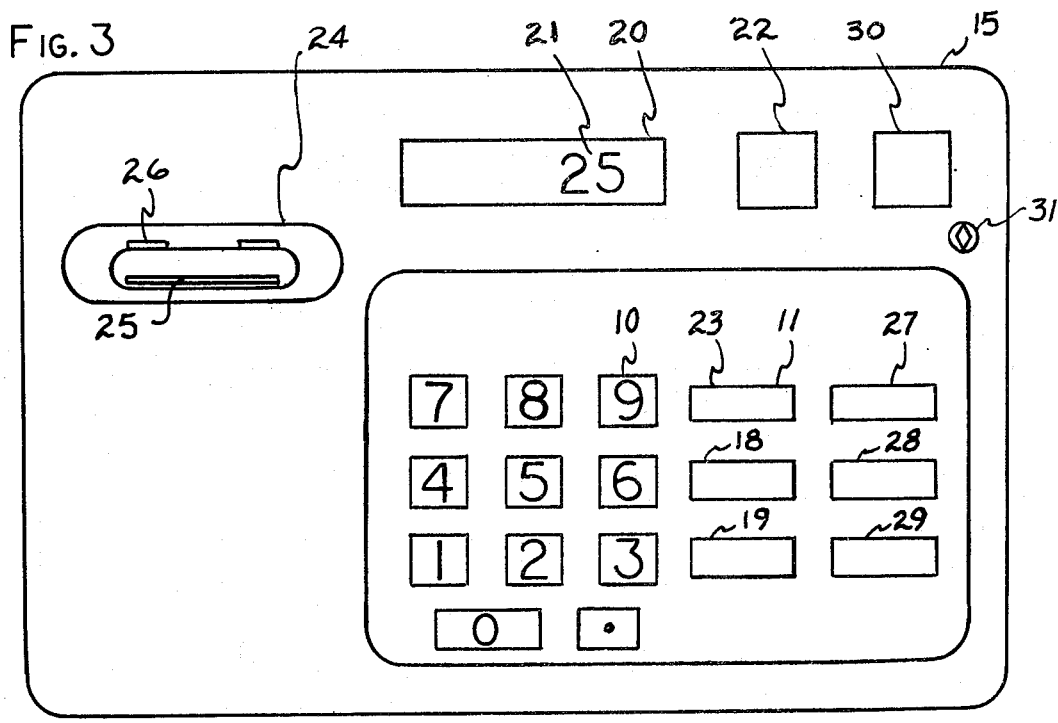
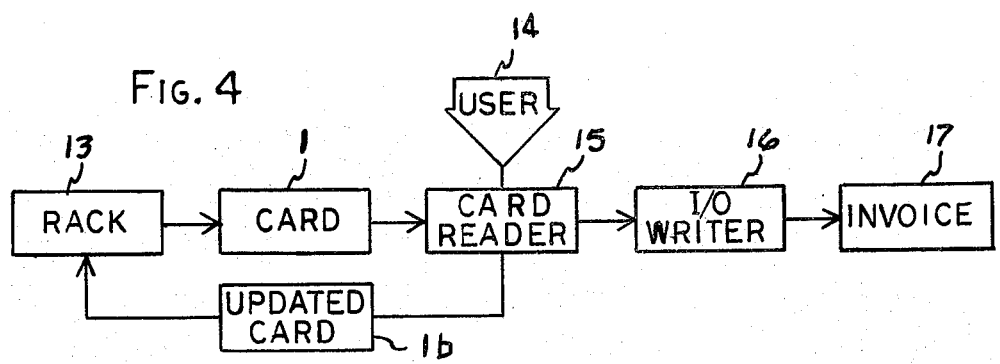

DATA CONTROL DEVICES

There is disclosed a card used for displaying and updating inventory data, capable of being read by a magnetic card reader. The data is both humanly and machine readable and can be updated to reflect a change in quantity or price or any other changes relating to the data therein. Further, both the visual and non-visual data remain intact when removed from an electrical field. In addition there is disclosed a means of insuring that the card, when presented to a card reading apparatus, is properly positioned. There is also shown a method whereby a printed invoice would become the permanent copy of a transaction.

The use of a plastic card bearing a magnetic stripe to store inventory data would not be significantly different over the existing art. However, the addition of a persistent electrochromic digital display to the same card would provide the user with substantial benefits not shown in the prior art. A better understanding of the present invention can be had by a brief analysis of the type of situation in which a card as disclosed would be useful.

Businesses dealing in goods have a recognized need to know with speed and accuracy certain key bits of information about those goods, namely description, quantity and value. Of these, quantity becomes the most important when the item in question is not stored in plain view of the parties to the transaction, but rather in a separate room or building as is the case in a retail lumber yard. The prior art is replete with and eager to provide with speed and accuracy a degree of sophistication in excess of the needs and means of many businesses. The present invention offers a simple means of data control, substantially lower in cost than existing electronic data processing devices, with an inherent degree of accuracy not found in the prior art. A further description will show that operator speed and accuracy during manual data entry are appreciably improved thru the reduction of user interface to the input of a single input variable.

BRIEF DESCRIPTION OF THE DRAWINGS

Referring to the drawings:

FIG. 1 is a front view of an inventory control card as used in a preferred embodiment of the present invention;

FIG. 2 is a back view of the same card;

FIG. 3 is a plan view of a typical card reader for use with the above named card;

FIG. 4 is a flow diagram illustrating the method and apparatus for reading and updating the above cards in an inventory control-invoice printing system.

BRIEF DESCRIPTION OF THE PREFERRED EMBODIMENT

It is understood that a potential user need not commit his entire inventory to a control method as described herein, but instead that a select portion of his inventory be monitored and updated by means of the present invention. For each of the items chosen to participate, a plastic card (FIG. 1) 1 similar to a type "A" credit card, serves a memory function, the address of which is the description 2, each description 2 being a clear and concise message relevant to the item involved. The description 2, is printed or affixed to the surface of the card in one of a number of ways well known to those skilled in the art. It is intended that through continued use of the description 2, the nomenclature of goods would become familiar to new or part-time users. A persistent electrochromic multi-element liquid crystal display 3 shows the quantity 3a and the value 3b current to the previous instant of the item description 2. Each segment 3d of each digit 3c is individually addressed when the segment leads 12 (FIG. 2) are placed in contact with the driving circuitry 26 (FIG. 3) of the card reader 15. The portion of card 1 above line 7 would be visible when stored in a suitable time-card like rack 13 (FIG. 4) the descriptions of which are well known in the prior art. The portion of card 1 below line 7 is hidden from view when stored in rack 13, and has a surface texture 4 suitable for pen or pencil additions 5 of data. It is also intended that adhesive faced labels, if placed on this portion of card 1 would not interfere with the cards 1 use in the card reader 15. The entire number of cards 1 used in rack 13 will give the user accurate, timely information at a glance concerning his inventory.

The lateral edges 8 of card 1 are shown to have tapers 8a, and 8b. These tapers 8a,8b, serve to align the card 1 in a precise and orderly location in rack 13. The tapered lateral portions 8a, 8b, further insure that the card 1 can be read only in the preferred orientation when presented to the card reader 15. In addition a notch 6 in card 1 would prevent a transaction from commencing if the card 1 were reversed so that the notch 6 would be as shown in FIG. 2.

FIG. 2 shows the reverse side of card 1, wherein segment leads 12 are positioned to align with the driving circuitry 26 on the card reader 15. Magnetic data tracks 9 store a concurrent generation of data with the electrochromic display 3, and in addition store other relevant inventory and educational information as would be useful if made a part of the permanent record of the transaction. In the preferred embodiment, magnetic track 9a would carry numerical data upon which a mathematical operation would be performed, track 9b would carry alpha-numeric messages only, and track 9c would carry confidential pricing or other information that could not be read by unauthorized users.

FIG. 3 shows a reader 15 suitable for use with the present invention card 1. There is shown a data entry keyboard 10, which is the user interface during a transaction, and instruction keys 11 used to execute a transaction. Key 23 locks the card 1 in position to begin a transaction. Key 18 has the dual function of reducing the quantity in stock by the quantity being sold and also instructing the writer 16 to print an invoice 17 describing the transaction. Key 19 is used to clear an error in data entry. A LED or similar display 20 is provided to indicate to the user through digits 21 the amount being entered on the keyboard 10. An instruction window 22 indicates to the user the cycle of operation and signals when an error in sequence has occured.

FIG. 4 shows the movement of card 1 from card rack 13 to card reader 15 where card 1 is acted upon by a single input variable 14 thereby producing an updated card 1b and an output signal which is transmitted to an input/output writer which in turn issues a printed invoice. Card 1b is also shown being returned to card rack 13.

CYCLE OF OPERATION

A complete understanding of the present invention can best be accomplished by assuming a transaction from start to finish. In a typical retail application, a potential customer inquires as to the availability of an item 2b designated on card 1 by the symbols "2 × 4 × 8 foot WF". The sales clerk (herein after called user) visually scans card rack 13 to determine if the item in question is regularly stocked. It is to be understood that the answer to this initial inquiry would in most cases be known to the user beforehand. Upon locating card 1 the user determines through display 3 that there is a quantity 3a "814" and each item has a value 3b of "1.20". If a decision to purchase does not ensue, the card 1 is not disturbed from its location in card rack 13. It is to be understood that the card has served a valid query-response function in the above case. If on the other hand, the customer makes a decision to purchase a quantity "25" of the item description 2b, the user manually removes card 1 from the card rack 13 and transports the same in the preferred orientation to the card reader 15 and presents the card 1 to the card reading sensor 24. If the user has not presented the card 1 in the preferred orientation, the tapered lateral edges 8a, 8b will prevent the proper alignment of the card 1 with the magnetic reading heads 25 and with the electrochromic digital driving circuitry 26. If the card 1 description 2 is not facing the user when presented, a signal 22 will inform the user that he has not presented the card properly. The notch 6 would activate signal 22. If the card 1 has been presented in the proper manner, a signal 30 would inform the user to proceed. The user then manually enters a single input variable 14, i.e., quantity being sold on keyboard 10. A LED display 20 will indicate to the user the amount being entered on keyboard 10. An incorrect entry can be cleared with key 19. When the user is satisfied the quantity has been entered correctly, he depress key 18 "sell". The card reader 15 reduces the quantity 3a by the quantity being sold and the result is stored on the card 1 as the current amount in stock. The display 3a is also changed at this time. The reader 15 also instructs the writer 16 to print a line of data in a predetermined format that becomes a permanent record of the transaction 17. The updated card 1b is manually returned to the card rack 13 by the user.

In addition there are provided on card reader 15, three instruction keys which will not function unless key 31 is unlocked. Key 27 is used to add items to quantity. Key 28 is used to instruct the reader to transmit all the data stored on card 1 to the writer 16, the nature of this data being confidential pricing information. Key 29 will provide a description only of the items and would be used as an inventory source document.

It is understood that the preferred embodiment is given by way of example and is not intended to limit in any way the scope and application of the present invention. More particularly, certain provisions therein may be changed, or specific means may be substituted for equivalent means without departing from the scope and spirit of the present invention.

What I claim is:

1. A portable document used to improve the speed and accuracy of data capture when presented to a reading device, comprising a plasticized generally rectangular support means provided with a pair of tapered longitudinally extending edge portions and a first pair of transversely extending edge portions, said edge portions defining therebetween more than one indicia receiving means and at least one indicia displaying means, wherein said indicia receiving means include a magnetic track and a persistent electrochromic display portion, and said display means include the same beforein mentioned persistent electrochromic display portion.

2. A document according to claim 1 whereby the persistent electrochromic display includes means to serve a valid function in data control when used in a query-response application, where said application would not require the physical manipulation of the document or electronic manipulation of data therein.

3. A document according to claim 1, wherein said document contains means for manual single input variable entry.

4. A document according to claim 1 wherein said persistent electrochromic display is connected to segment leads positioned on one surface of the said document to respond to corresponding leads in a driving circuitry.

5. The document recited in claim 1 wherein said document has spaced segment leads of the sides thereof opposite said side having said indicia-receiving means thereon.

6. The document recited in claim 1 wherein said magnetic track is disposed on the opposite side of said document from said persistent electrochromic display portion.

7. A portable document used to improve the speed and accuracy of data capture when presented to a reading device comprising, a plasticized, generally rectangular support means provided with a pair of longitudinally-extending edge portions and a first pair of transversely extending edge portions, said edge portions defining therebetween more than one indicia, displaying means wherein said indicia-receiving means include a magnetic track and a persistent electrochromic display portion, and said display means include the same beforein mentioned persistent electrochromic display portion.

8. The document according to claim 7 wherein said document has spaced segment leads on the sides thereof opposite said side having said indicia-receiving means thereon.

9. The document recited in claim 7 wherein said magnetic track is disposed on the opposite side of said document from said persistent electrochromic display portion.

* * * * *